US010974782B2

(12) United States Patent
Foley

(10) Patent No.: US 10,974,782 B2
(45) Date of Patent: Apr. 13, 2021

(54) CONTROLLER FOR A LIGHT ELECTRIC VEHICLE

(71) Applicant: NEUTRON HOLDINGS, INC., San Francisco, CA (US)

(72) Inventor: Nicholas Foley, San Francisco, CA (US)

(73) Assignee: NEUTRON HOLDINGS INC., San Francisco, CA (US)

( * ) Notice: Subject to any disclaimer, the term of this patent is extended or adjusted under 35 U.S.C. 154(b) by 0 days.

(21) Appl. No.: 16/705,172

(22) Filed: Dec. 5, 2019

(65) Prior Publication Data

US 2020/0180718 A1    Jun. 11, 2020

Related U.S. Application Data

(60) Provisional application No. 62/775,836, filed on Dec. 5, 2018.

(51) Int. Cl.
*B62J 6/01* (2020.01)
*G06Q 30/06* (2012.01)
*B62J 50/20* (2020.01)

(52) U.S. Cl.
CPC ............ *B62J 6/01* (2020.02); *G06Q 30/0645* (2013.01); *B62J 50/20* (2020.02); *B62K 2204/00* (2013.01)

(58) Field of Classification Search
None
See application file for complete search history.

(56) References Cited

U.S. PATENT DOCUMENTS

| 2019/0009849 A1* | 1/2019 | Komatsu | B62J 1/08 |
| 2019/0056745 A1* | 2/2019 | Meehan | B60L 58/10 |
| 2019/0149645 A1* | 5/2019 | Montez | F16B 21/073 |
| | | | 455/556.1 |
| 2020/0086939 A1* | 3/2020 | Iseman | B60R 25/1004 |
| 2020/0180728 A1 | 6/2020 | Ohashi | |

* cited by examiner

*Primary Examiner* — Brent Swarthout
(74) *Attorney, Agent, or Firm* — Dentons US LLP

(57) ABSTRACT

The present disclosure describes a controller for a light electric vehicle. The controller may include a user interface that includes one or more visual indicators and selectable buttons. The visual indicators may be used to convey various status indicators and/or alerts to an individual that is riding the light electric vehicle. The selectable buttons may be used to alter an operating state of the light electric vehicle and/or to provide operating status information about the light electric vehicle.

16 Claims, 10 Drawing Sheets

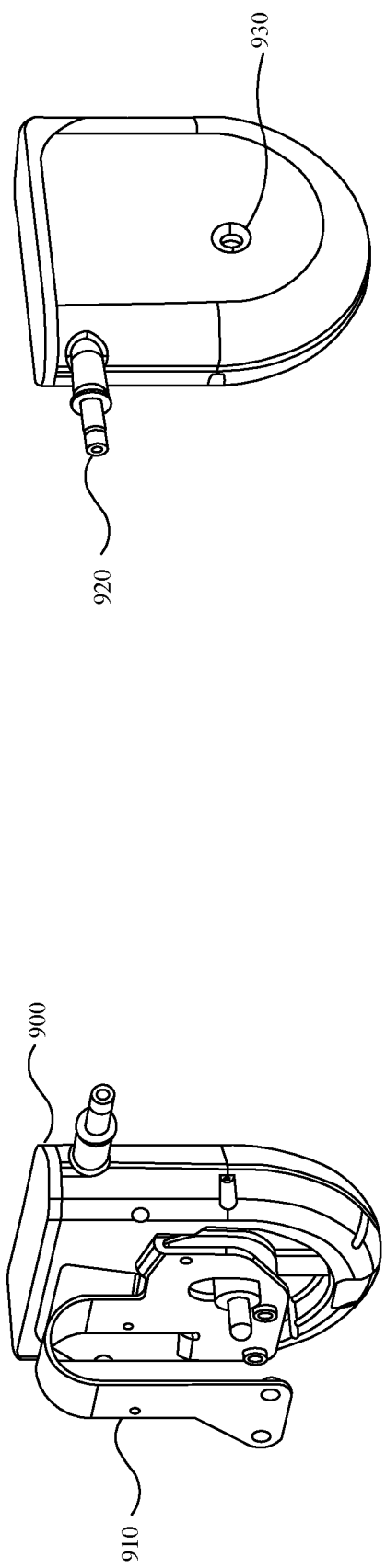
FIG. 9A
FIG. 9B
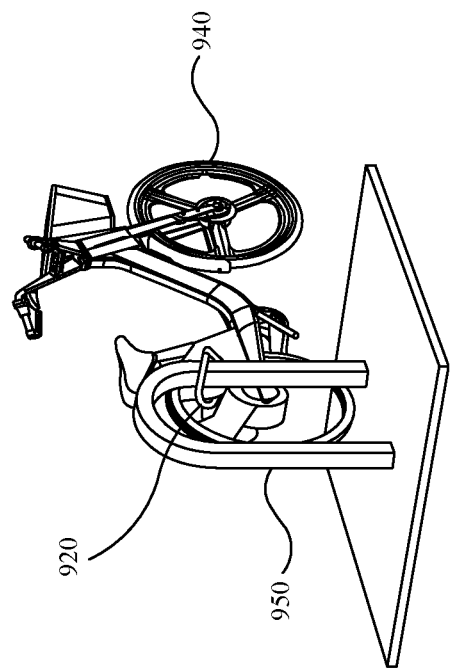
FIG. 9C

CONTROLLER FOR A LIGHT ELECTRIC VEHICLE

CROSS-REFERENCE TO RELATED APPLICATIONS

This application claims priority to U.S. Provisional Application No. 62/775,836 entitled "Controller for a Vehicle" filed on Dec. 5, 2018, the entire disclosure of which is hereby incorporated by reference in its entirety.

BACKGROUND

Shared vehicle systems for electric vehicles such as bicycles, scooters or other vehicles are systems that provide services in which electric vehicles are made available for shared use to individuals on a short-term basis for a price. Each electric vehicle in the system can be part of the larger ridesharing system.

SUMMARY

The present disclosure describes a controller for a light electric vehicle. The controller may include a user interface that includes one or more visual indicators and/or selectable buttons or elements. The visual indicators may be used to convey various status indicators and/or alerts to an individual that is riding the light electric vehicle. The selectable buttons may be used to alter an operating state of the light electric vehicle or to provide information about the light electric vehicle to a light electric vehicle management system.

Accordingly, the present disclosure describes a controller for a light electric vehicle. In some examples, the controller includes a set of visual indicators. Each visual indicator of the set of visual indicators may be selectively illuminated based, at least in part, on detected information associated with the light electric vehicle. The controller may also include at least one selection mechanism. When the selection mechanism is selected, information about the light electric vehicle is provided to a light electric vehicle management system. Selection of the selection mechanism may also alter an operating state of the light electric vehicle.

Also described is a method for operating a controller for a light electric vehicle. In some examples, the method may be executed by a light electric vehicle management system. For example, the light electric vehicle management system may receive light electric vehicle information and analyze the light electric vehicle information to determine one or more instructions that will be sent to the controller associated with the light electric vehicle. The controller may have one or more visual indicators. The light electric vehicle management system may send the instructions to the controller to cause the controller to illuminate at least one of the one or more visual indicators.

The present disclosure also describes a system comprising at least one processor and a memory coupled to the at least one processor. The memory stores instructions that, when executed by the at least one processor, perform operations for operating a controller associated with a light electric vehicle. In some examples, the operations include receiving light electric vehicle information and analyzing the light electric vehicle information to determine one or more instructions to be sent to a controller associated with the light electric vehicle. In some examples, the controller includes one or more visual indicators. The system may send the instructions to the controller to cause the controller to illuminate at least one of the one or more visual indicators.

BRIEF DESCRIPTION OF THE DRAWINGS

FIGS. 9A-9C illustrate various views of a locking mechanism for a light electric vehicle according to one or more examples.

DETAILED DESCRIPTION

Figure 1:
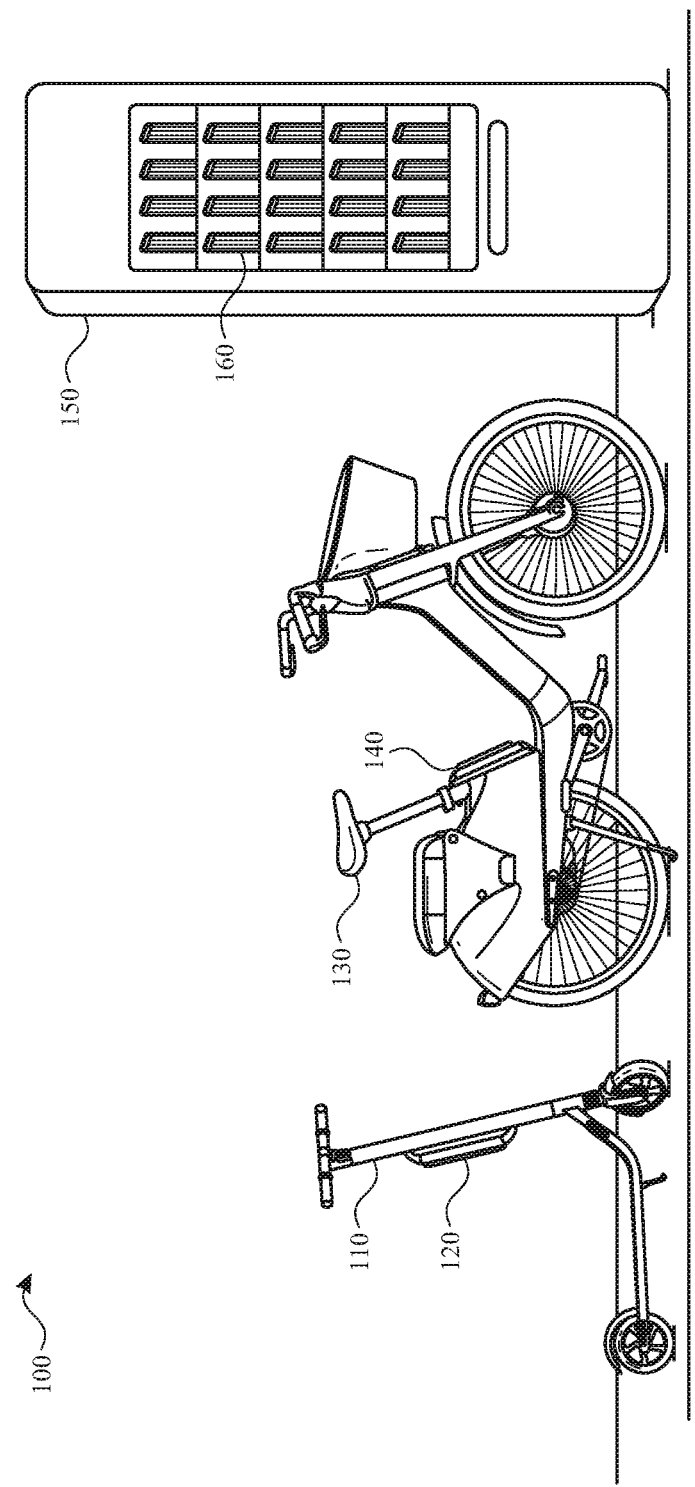
FIG. 1 illustrates a light electric vehicle ridesharing system according to an example.

In the following detailed description, references are made to the accompanying drawings that form a part hereof, and in which are shown by way of illustrations specific examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present disclosure describes a control mechanism (also referred to herein as a controller) for a light electric vehicle. In some examples, the light electric vehicle is part of a light electric vehicle ridesharing system. The control mechanism may include a number of different visual indicators or icons that assist an individual is reserving, renting and/or using the light electric vehicle. In some examples, the visual indicators may be selectable (e.g., depressible buttons, capacitive sensors, etc.) and/or cause certain actions to be performed based on received input. For example, when a visual indicator is selected, an operating state of the light electric vehicle may be altered. In other examples, information about the light electric vehicle may be provided to a light electric vehicle management system. In yet other examples, the visual indicators may be used to relay information to the individual that is riding the light electric vehicle.

As will be described in greater detail herein, one or more of the visual indicators on the control mechanism may be used by an individual to reserve a light electric vehicle, unlock a locking mechanism associated with the light electric vehicle, put the light electric vehicle on hold (e.g., lock the vehicle but keep the vehicle reserved during a reservation or rental period), return (e.g., end a reservation period) of a light electric vehicle, release a rechargeable battery from the light electric vehicle and/or report a maintenance issue with the light electric vehicle.

The visual indicators on the control mechanism may also be used to display notifications associated with the use or operating parameters of the light electric vehicle. For example, the control mechanism may be used to communicate a maintenance issue of the light electric vehicle to an individual, inform the individual that the individual is attempting to park the light electric vehicle in a no parking zone, inform the individual of an amount of charge remaining in a rechargeable battery associated with the light electric vehicle, inform the individual of an available incentive (e.g., parking the light electric vehicle in a certain location such as a particular zone, address, charging or docking station), and/or inform the individual that the light electric vehicle has entered a particular geographic area with reduced speeds and/or an area that restricts or prohibits the use of light electric vehicles. Although specific examples are given, the control mechanism may be used to receive and/or display many types of information and is not limited to the examples included above.

The control mechanism may control multiple on-board systems of the light electric vehicle and/or the control mechanism itself. These systems include, but are not limited to, an interface system, a locking system, a lighting system, a location/navigation system, a local incentive system, and a power level system. The control mechanism may also include an interface (e.g., a display, a touch-sensitive surface, one or more depressible buttons, etc.), one or more processing units, a memory and a Global Positioning System (GPS) or Global Navigation Satellite System (GNSS).

The control mechanism may be communicatively coupled to a light electric vehicle management system over one or more wired and/or wireless networks and/or communication protocols such as a cellular network, wireless network, wired network, Bluetooth, Bluetooth Low Energy, and/or Near-Field Communication. In some examples, the control mechanism can (optionally) collect information about an individual as an individual reserves a light electric vehicle. This information may be received from a computing device of the individual, be a collected biometric sample, an RFID tag, barcode, or other identifier.

Data collected by the control mechanism can be sent to the light electric vehicle management system and be used to authenticate the user, collect revenue, monitor light electric vehicles in the system, and manage the overall light electric vehicle ridesharing system.

In some examples, the control mechanism and/or the light electric vehicle management system can communicate with various computing devices. For example, the control mechanism can detect a computing device associated with an individual and identify the individual (or communicate with the light electric vehicle management system to identify the individual) based on the individual's computing device and/or provided authentication credentials. The light electric vehicle management system can match the individual to a profile that includes one or more financial instruments that can be used to pay for use of the light electric vehicle or receive incentives from the system. Once the individual has been identified, the control mechanism can send a signal to the locking mechanism/system to unlock the light electric vehicle and begin a use period for the individual.

FIG. 1 illustrates an example environment 100 in which aspects of the present disclosure may be practiced. As illustrated, environment 100 includes an electric scooter(s) 110, an electric bicycle(s) 130, and a rechargeable battery kiosk(s) 150. It will be appreciated that the electric scooter 110 and the electric bicycle 130 are provided as example light electric vehicles and that, in other examples, aspects described herein apply to other types of light electric vehicles.

As described herein, the environment 100 includes a network service that receives information from the electric scooter 110 and/or the electric bicycle 130 (also referred to herein as light electric vehicles) over a network communication channel (e.g., one or more networks, the Internet, etc.). The information enables an individual, using a client application executing on a computing device, to locate, request, and/or reserve (e.g., rent or borrow for a duration of time) one or more light electric vehicles.

In some examples, the network service includes one or more computing systems or servers that are remote from the computing device of the individual and the light electric vehicles. The one or more computing systems includes an application programming interface (API) that enables the one or more computing systems to receive information from, send information to, and otherwise interact with the computing device, the light electric vehicles 110, 130 and/or the rechargeable battery kiosk(s) 150.

For example, the client application executing on the computing device of the individual receives, from the network service over the network communication channel, information about a location of one or more of the light electric vehicles. The location of each of the light electric vehicles can then be provided on a user interface of the client application.

In one example, the user interface of the client application includes a map that displays a determined location of the individual and/or a determined location of the light electric vehicles. In some examples, the determined location of the individual and/or the determined location of the light electric vehicles is based, at least in part, on Global Positioning System (GPS) data (or other location information) received by the network service over the network communication channel.

The user interface of the client application displays the location information of the individual and the light electric vehicles as different icons (or other such visual representations). Once the location information is displayed, the individual may select an icon representing a type of light electric vehicle (e.g., an icon for an electric scooter 110 or an icon for an electric bicycle 130). The user interface of the client application then generates or determines a route (e.g., provides directions) from the individual's current location to the selected light electric vehicle. Selection of one of the icons may also enable the individual to reserve (e.g., place a hold on) the light electric vehicle (to ensure that the light electric vehicle will be at the determined location when the individual arrives), rent the light electric vehicle and/or borrow the light electric vehicle for a period of time.

Each light electric vehicle and/or the network service also includes a location tracking system that tracks, receives and/or determines a location of each light electric vehicle as they are used. In some examples, the location tracking system tracks the location information of the light electric vehicle in real-time or substantially real-time. In other examples, the location tracking system determines the location information of the light electric vehicle at periodic intervals (e.g., every minute, every five minutes, every ten minutes, etc.). In yet other examples, the location tracking system may track the location of the light electric vehicle in real-time or substantially real-time when the light electric vehicle is reserved, rented or otherwise used by an individual and may track location information at periodic intervals when the light electric vehicle has been reserved or is otherwise not in use.

The one or more computing systems of the network service also include one or more databases that store information about each of the light electric vehicles and/or the rechargeable battery kiosk(s) 150. For example, the one or more databases may store location information for each light electric vehicle and/or the rechargeable battery kiosk(s) 150, rechargeable battery status information for rechargeable batteries used by each light electric vehicle and/or in the rechargeable battery kiosk(s) 150, rechargeable battery kiosk information (e.g., the number of rechargeable batteries housed by the rechargeable battery kiosk 150), and/or light electric vehicle status information (e.g., how many times the light electric vehicle has been reserved, whether the light electric vehicle is damaged, whether the light electric vehicle should be serviced, etc.).

The one or more databases may also store information about the individual. This information may include a profile of the individual (e.g., username, contact information, etc.) security credentials of the individual (e.g., a password), historical usage data, payment information and the like.

The one or more computing systems of the network service may also include a matching system. The matching system receives, manages or otherwise handles various requests from the individual. The requests may include light electric vehicle rental requests and light electric vehicle reservation requests. For example, when a light electric vehicle use request is received from the client application executing on the individual's computing device, the matching system may communicate with the location tracking system and determine which light electric vehicle should be matched with or otherwise assigned to the requesting individual.

The one or more computing systems of the network service may also include a payment system that processes payment information of the individual and/or distributes received incentives to the individual. For example, when an individual rents and uses a light electric vehicle, the individual may be charged for the usage based on a duration of use and/or a travel distance. Once the individual has finished using the light electric vehicle (e.g., by arriving at her intended destination, a check-in point, a battery kiosk 150, etc.), the payment system may automatically process the payment information of the individual. Likewise, if the individual is offered an incentive (e.g., for parking the light electric vehicle in a certain location), the payment system may apply or otherwise provide the incentive to the individual.

As discussed above, the environment 100 includes one or more light electric vehicles including, but not limited to, an electric scooter 110 and an electric bicycle 130. In examples, the electric scooter 110 includes vehicle components (e.g., wheels, axles, baseboard, handlebar, braking mechanisms, etc.), one or more electric motors, control systems, sensors, speakers, and/or lights, which may be powered by a rechargeable battery. The rechargeable battery may be secured to the electric scooter 110 by a battery holster 120.

Likewise, and in some examples, the electric bicycle 130 includes vehicle components (e.g., wheels, axles, chains, gear ratios, bicycle seat, handlebar, bicycle frame, braking mechanisms, etc.), one or more electric motors, control systems, sensors, speakers, and/or lights, which may also be powered by a rechargeable battery. The rechargeable battery may be secured to the electric bicycle 130 by a battery holster 140.

The control system of the electric scooter 110 and/or the electric bicycle 130 may include a controller or control mechanism such as described herein. As such, the control system may manage the power output to the one or motors, provides a visual indication as to a charge level of the rechargeable battery in the battery holster 120, and/or communicates directly (e.g., via Wi-Fi, Bluetooth, etc.) or indirectly (e.g., via one or more remote computing devices, one or more networks, the Internet, etc.) with the computing device of the individual and/or with the network service.

Example communications include, but are not limited to, initiating locking or unlocking of the electric scooter 110 or the electric bicycle 130 (e.g., initiating or ending a travel session), initiating a battery swap to exchange a rechargeable battery in the battery holster 120 or the battery holster 140 with one in a rechargeable battery kiosk 150, determining a location and/or status information of the electric scooter 110 or the electric bicycle 130, and determining a location of a rechargeable battery and/or a rechargeable battery kiosk 150. Lights, speakers, and/or other output devices of the electric scooter 110 or the electric bicycle 130 may be used to provide an indication as to the location of the electric scooter 110 or the electric bicycle 130 or as an anti-theft mechanism, among other examples.

As shown in FIG. 1, each light electric vehicle includes a battery holster. For example, the battery holster 140 is affixed to the seat tube of the electric bicycle 130, while the battery holster 120 is illustrated as being affixed to the handlebar column of the electric scooter 110. It will be appreciated that the locations of the battery holsters 120 and 140 are provided as examples, and that a battery holster may be positioned in a variety of alternate locations in other examples. For example, the battery holster 140 may be affixed to the handlebar column or the cross bar of the electric bicycle 130. As another example, the battery holster 120 may be affixed to the deck or located near the rear of the electric scooter 110.

The battery holsters 120 and 140 are each operable to receive a rechargeable battery. For example, an individual may operate a light electric vehicle for a period of time and then determine that the rechargeable battery in use by the light electric vehicle needs to be recharged. In some instances, the light electric vehicle, or the rechargeable battery itself, may communicate current battery charge information for the rechargeable battery to the computing device of the individual. In another example, the rechargeable battery and/or battery holster 120 and 140 may include a visual indicator to display the charge level of the rechargeable battery. In yet another example, a control mechanism coupled to the light electric vehicle may include one or more indicators that reflect the charge level of the rechargeable battery. As an addition or an alternative, the electrical vehicle, the control mechanism and/or the rechargeable battery itself, may communicate current battery charge information for the rechargeable battery to the network service, which can provide battery information to the computing device of the individual. When this occurs, the individual may be directed to a rechargeable battery kiosk 150. For example, the network service can transmit data, over one or more networks, to the computing device and/or the control mechanism to cause the computing device and/or control mechanism to display information about a particular rechargeable battery kiosk 150 that individual could travel to in order to initiate a rechargeable battery exchange.

When the individual arrives at the rechargeable battery kiosk 150, the individual may exchange the light electric vehicle's current battery with another rechargeable battery housed by the rechargeable battery kiosk 150, thereby enabling the light electric vehicle to continue or resume operation. In some instances, the individual can use the client application executing on the computing device of the individual to locate and/or select a rechargeable battery kiosk 150, receive directions to the rechargeable battery kiosk 150, and initiate a rechargeable battery exchange with the rechargeable battery kiosk 150 when the individual arrives at its location. In another example, a selectable element (e.g., a button) on the control mechanism may enable the individual to initiate a rechargeable battery exchange.

According to examples, when the rechargeable battery exchange is initiated, the control system of the light electric vehicle may enable the rechargeable battery 160 to be removed from a battery holster, such as battery holster 120 or 140. The rechargeable battery 160 may then be exchanged for a different rechargeable battery 160 housed by the rechargeable battery kiosk 150. The rechargeable battery 160 may subsequently be inserted into the battery holster of the light electric vehicle.

The rechargeable battery kiosk 150 stores and charges a set of rechargeable batteries 160. Each rechargeable battery 160 in the set can be used by both the electric scooter 110 and the electric bicycle 130. In some examples, multiple rechargeable battery kiosks 150 are located within a city, county, or other geographic region. For example, one rechargeable battery kiosk may be located in or otherwise associated with a first geographic area within a geographic region and another rechargeable battery kiosk may be located in or otherwise associated with a second geographic area within the geographic region.

Thus, when an individual is traveling through the geographic region on an light electric vehicle and wants or needs to exchange the light electric vehicle's current rechargeable battery for one that has more charge, the individual may be directed (e.g., via the client application executing on the individual's computing device) to the rechargeable battery kiosk 150 associated with the geographic region. When the individual arrives at the rechargeable battery kiosk 150, the individual can exchange their current rechargeable battery for one that is fully charged or substantially fully charged. This enables the individual to travel using a light electric vehicle across distances that may otherwise not be possible using the power provided by one charge of a rechargeable battery.

In some examples, the rechargeable battery kiosk 150 comprises a control system that communicates directly or indirectly with a computing device of the individual and/or the control mechanism of the light electric vehicle when performing the rechargeable battery exchange such as described above. In some examples, the control system communicates with a remote computing device(s), e.g., that implements the network service, using a connection to one or more networks, such as a Wi-Fi network and/or a cellular network. The rechargeable battery kiosk 150 may receive and/or report rechargeable battery status information to a remote computing device(s). The battery status information can include, but is not limited to, battery charge levels, battery health, an amount of rechargeable batteries currently available at the rechargeable battery kiosk, and/or usage demand statistics.

Figure 2:
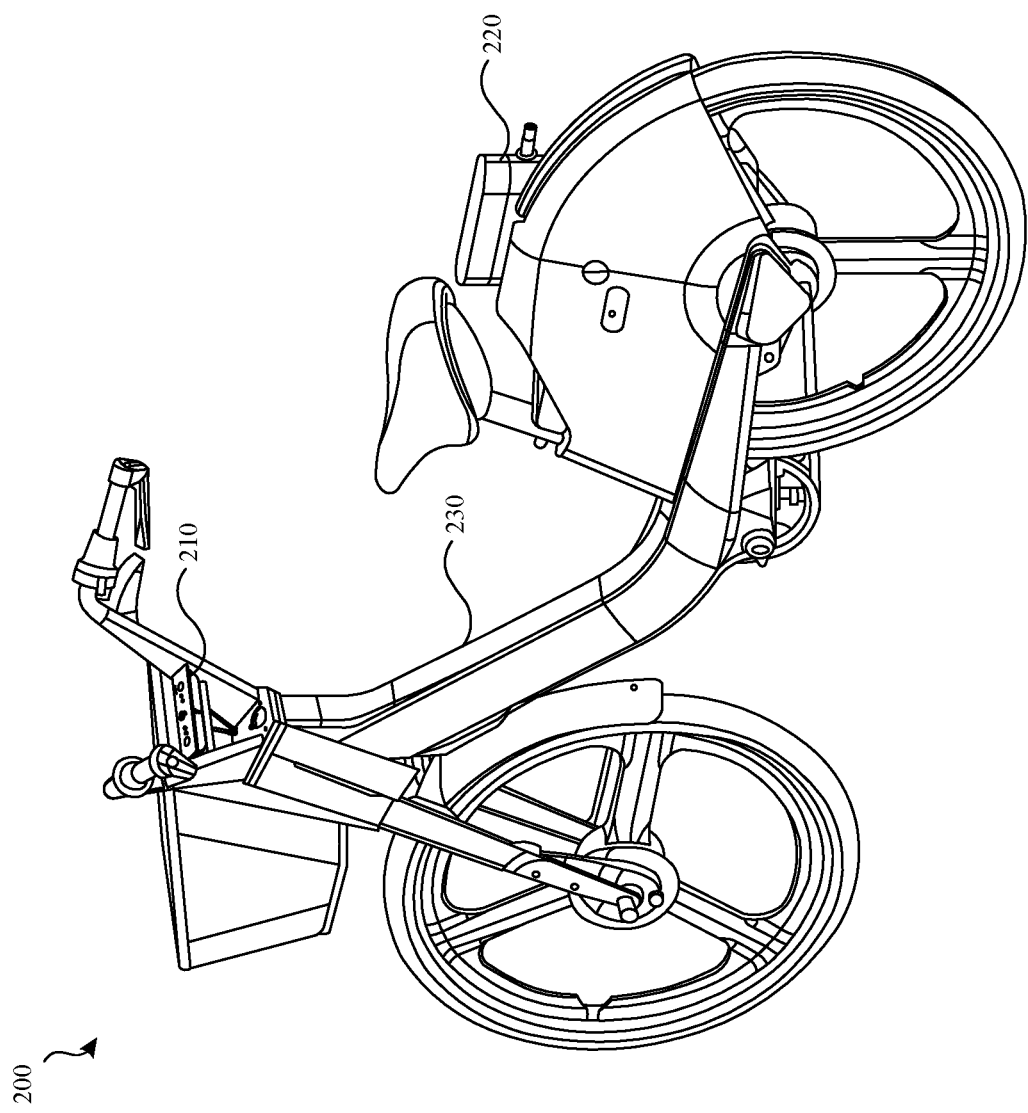
FIG. 2 illustrates an example light electric vehicle with an attached controller according to an example.

FIG. 2 illustrates an example light electric vehicle 200 having a controller 210. The light electric vehicle 200 may be similar to the electric bicycle 130 shown and described with respect to FIG. 1. Although an electric bicycle is shown and described, the controller 210 may be used by a variety of different light electric vehicles. In addition to the controller 210, the light electric vehicle 200 may have various components and mechanisms such as a locking mechanism 220, main hollow frame tube 230, and a pedal assist motor.

In some examples, the controller 210 communicates (over one or more communication channels) with a light electric vehicle management system. The communication between the light electric vehicle management system and the controller 210 may include instructions from the light electric vehicle management system, location information determined by the controller 210, rechargeable battery status/health information, incentive information and the like. As this information is transmitted between the controller 210 and the light electric vehicle management system, one or more visual indicators on the controller 210 may be illuminated.

The controller 210 may also be used to control the locking mechanism 220 of the light electric vehicle 200 and/or a lighting system of the light electric vehicle 200. The hollow frame tube 230 may house internal cables and/or a rechargeable battery. The internal cables can connect the controller 210 to the rechargeable battery and to other systems (e.g., a lighting system) of the light electric vehicle 200.

Figure 3:
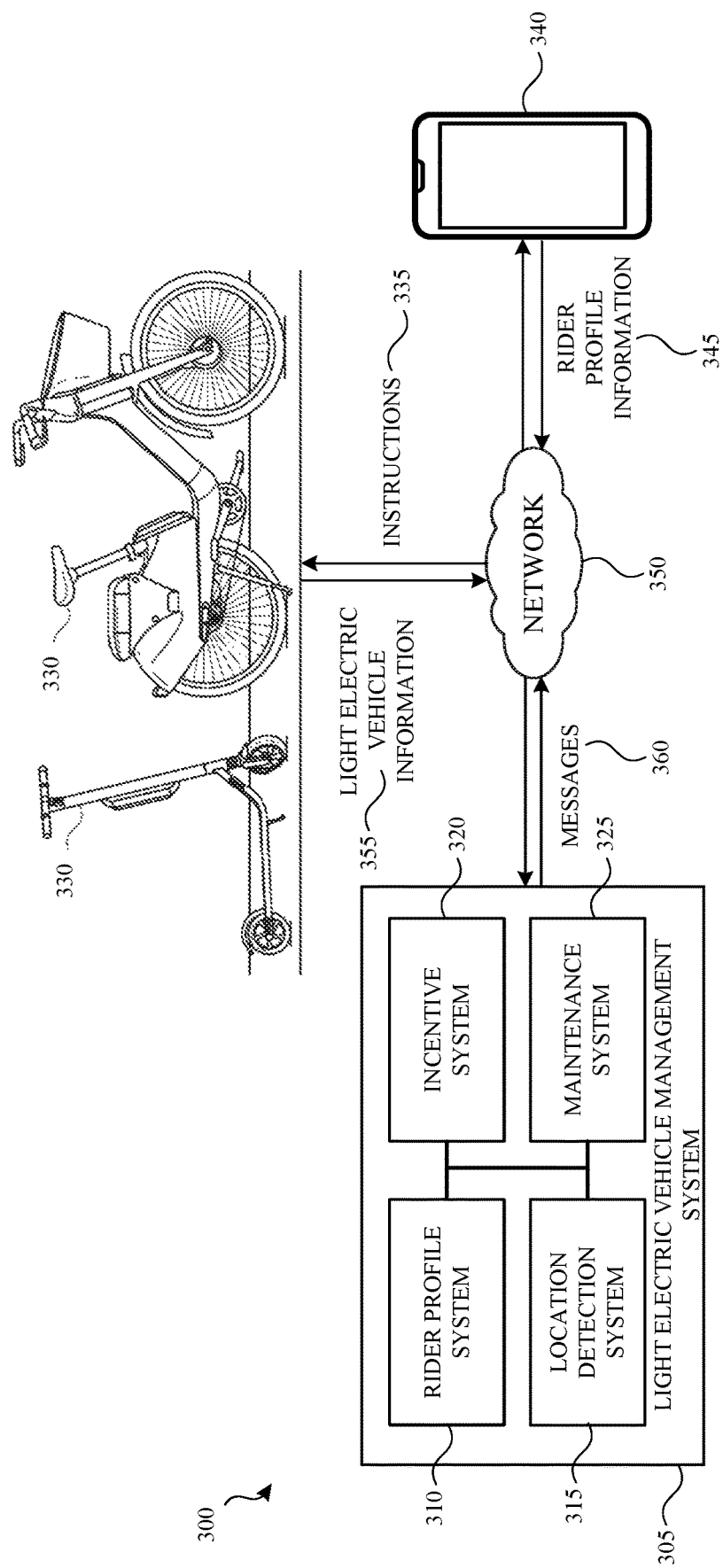
FIG. 3 illustrates a system for sending instructions to and/or receiving information from a light electric vehicle controller according to an example.

FIG. 3 illustrates an example system 300 in which a controller of a light electric vehicle 330 may be used to communicate with and/or receive instructions from a light electric vehicle management system 305 according to an example. In some examples, the controller described with respect to FIG. 3 may be similar to the controller 210 (FIG. 2) described above. The system 300 may be used with any number of different light electric vehicles 330 including electric bicycles, electric scooters, and so on.

Although FIG. 3 illustrates a single electric bicycle and a single electric scooter (collectively referred to as light electric vehicle(s) 330), the system 300, and more specifically, the light electric vehicle management system 305, may be used to communicate with and/or send instructions to many different controllers coupled to various light electric vehicles 330 in a fleet of light electric vehicles simultaneously or substantially simultaneously.

The light electric vehicle management system 305 may include a rider profile system 310, a location detection system 315, an incentive system 320 and a maintenance system 325. Each of these systems may work individually and/or in combination with other systems to provide instructions 335 to the controller of a light electric vehicle 330 and/or messages 360 to a computing device 340 associated with an individual and/or to the controller.

For example, and as shown in FIG. 3, the light electric vehicle management system 305 may receive rider profile information 345 from a computing device 340 associated with an individual over the network 350. The rider profile information 345 may be sent to the light electric vehicle management system 305 when an individual wants to reserve and use a light electric vehicle 330. As such, the individual may access an application executing on the computing device 340 and submit a reservation request to the light electric vehicle management system 305. The reservation request may be made while an individual is remote from the light electric vehicle 330 and/or while the individual standing next to the light electric vehicle 330. In some examples, the application executing on the computing device 340 may provide rider profile information 345 to the rider profile system 310 of the light electric vehicle management system 305.

The rider profile information 345 may contain profile information about the individual that submitted the reservation request or use request. In some examples, the rider profile information 345 may contain information about the number of times the individual has reserved and/or used light electric vehicles 330, various incentives received by the individual, one or more routes taken by the individual while using light electric vehicles 330, the times of day and/or days of the week the individual reserved and/or used light electric vehicles 330, light electric vehicle riding habits of the individual (e.g., how fast the individual typically rides light electric vehicles 330, a pedaling cadence of the individual, amount of power of a rechargeable battery that is typically consumed by the light electric vehicle 330), and so on.

The rider profile information 345 may be provided to the rider profile system 310 each time a light electric vehicle 330 is reserved and/or used by the individual. In other examples, the rider profile system 310 may receive and use sign-in credentials from the computing device 340 associated with the individual to access rider profile information 345 that has been securely stored in the rider profile system 310. The stored rider profile information 345 may be updated as new or additional information (e.g., additional routes taken by the individual, changes in riding habits, etc.) is received from the computing device 340 and/or light electric vehicle 330.

In some examples, when the rider profile information 345 is received, the rider profile system 310 may send instructions 335 to the controller of the light electric vehicle 330 to automatically unlock a locking mechanism (e.g., locking mechanism 220 (FIG. 2)) associated with the light electric vehicle 330. Upon receipt of the instructions 335, the controller may cause one or more visual indicators to be illuminated thereby providing notice to the individual that the light electric vehicle 330 is ready for use.

Figure 7:
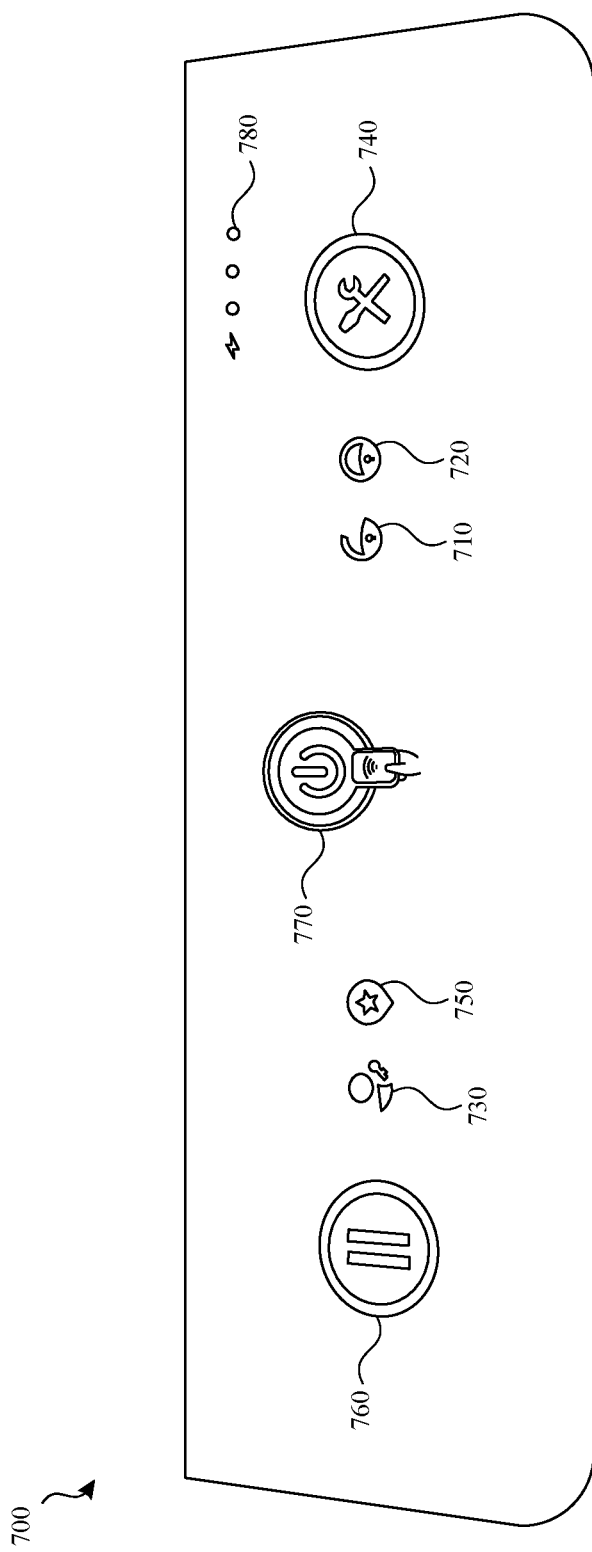
FIG. 7 illustrates various example visual indicators provided on a controller for a light electric vehicle according to an example.

For example and referring to FIG. 7, when the controller 700 receives instructions to unlock or otherwise release a locking mechanism of the light electric vehicle, the controller 700 may cause an illuminated visual indicator to switch from a locked indicator 710 to an unlocked indicator 720. Although both a locked indicator 710 and an unlocked indicator 720 are shown, both indicators are not required and the controller 700 may only have either the locked indicator 710 or the unlocked indicator 720. Thus, when the instructions are received, the controller 700 may illuminate the visual indicator as needed to notify the individual as to whether the light electric vehicle is locked and/or unlocked.

For example, if the controller 700 only includes a locked indicator 710, the controller 700 may illuminate the locked indicator 710 in a first color (e.g., red) when the light electric vehicle is locked with the locking mechanism and illuminate the locked indicator 710 in a second color (e.g., green) when the locking mechanism of the light electric vehicle is unlocked. In yet another example, the controller 700 may illuminate the locked indicator 710 when the locking mechanism of the light electric vehicle is locked and but not illuminate the locked indicator 710 when the locking mechanism of the light electric vehicle is unlocked.

Likewise, if the controller 700 only included an unlocked indicator 720, the controller 700 may illuminate the unlocked indicator 720 in a first color (e.g., red) when the locking mechanism of the light electric vehicle is locked and illuminate the unlocked indicator 720 in a second color (e.g., green) when the locking mechanism of the light electric vehicle is unlocked.

In some examples, once the light electric vehicle has been reserved and/or is in use by the individual, the controller 700 may cause a reserved visual indicator 730 to be illuminated. Thus, if a second individual (e.g., a different individual from the individual the provided rider profile information 345) approaches the light electric vehicle and attempts to reserve it, illumination of the reserved visual indicator 730 can notify that individual that this particular light electric vehicle is not available for reservation at the current time.

The reserved visual indicator 730 may be illuminated during the entire reservation period of the individual that submitted the rider profile information 345 (FIG. 3). If the individual has ended her use, selected a different light electric vehicle and/or caused a reservation period to time out (e.g., by not beginning an actual use period of the light electric vehicle within a threshold amount of time from making the reservation (e.g., 5 minutes)), the illumination of the reserved visual indicator 730 may be removed (or switched from a different color (e.g., red to green)) thereby providing notice to other individuals that this particular light electric vehicle is available for reservation and use.

Referring back to FIG. 3, the light electric vehicle management system 305 may also receive light electric vehicle information 355 from the light electric vehicles 330 over the network 350. The light electric vehicle information 355 may include information about one or more operating parameters of the light electric vehicle 330, a location of the light electric vehicle 330, whether the light electric vehicle 330 is currently being used and/or is reserved, whether a locking mechanism of the light electric vehicle 330 is engaged or disengaged, whether a maintenance event has been detected, whether a hold has been placed on the light electric vehicle 330 (e.g., whether an operating state of the light electric vehicle 330 has been altered) and so on.

In some examples, some light electric vehicle information 345 may be collected by one or more sensors associated with the light electric vehicle 330. The information collected by the sensors may be used to determine whether the light electric vehicle is operating below an operation threshold and/or whether various components of the light electric vehicle are operating as expected.

For example, the light electric vehicle 330 may have a sensor that reads the tire pressure of the light electric vehicle 330, a sensor that detects an amount of torque that is being applied to one or more pedals, a sensor that detects an amount of traction provided by the tires of the light electric vehicle 330 and so on. Although specific sensors are mentioned, the light electric vehicle 330 may have any number of sensors that detect and/or determine an operating status of various components or parts of the light electric vehicle 330.

When the light electric vehicle information 355 is received by the maintenance system 325 of the light electric vehicle management system 305 (e.g., via an API and/or over the network 350), the maintenance system 325 may determine whether the light electric vehicle 330 is experiencing a maintenance event. If the maintenance system 325 detects a maintenance event, the light electric vehicle management system 305 may send one or more instructions 335 to the controller of the light electric vehicle 330 to illuminate a maintenance event indicator. The maintenance system 325 may also provide one or more messages 360 to the controller and/or the computing device 340 to provide instructions about the maintenance event to the individual (e.g., how the individual can address the maintenance event).

Once illuminated, the maintenance event indicator may provide notice to the individual that is riding the light electric vehicle 330 (or to an individual that is reserving the light electric vehicle 330) that potential unsafe riding conditions may exist. As such, the individual may be encouraged to end their reservation/use period of the light electric vehicle 330, perform a maintenance activity on the light electric vehicle 330 and/or take the light electric vehicle 330 to a particular location. In some examples, the maintenance activity and/or the requested location may be provided to the computing device 340 of the individual and/or provided on a display of the controller.

FIG. 7 illustrates an example maintenance event indicator 740. Although the above example describes that the maintenance system 325 may provide instructions to illuminate the maintenance event indicator 740, the maintenance event indicator 740 may be selectable by an individual riding the light electric vehicle. For example, the maintenance event indicator 740 may be a depressible button, be associated with a capacitive sensor (or other touch/force sensor) or some other selection mechanism. Once input has been provided to the maintenance event indicator 740, the controller 700 may transmit a maintenance event notification to the maintenance system 325.

For example, the individual riding the light electric vehicle may notice that the light electric vehicle has a flat tire or is not accelerating or braking efficiently. Accordingly, the individual may press or otherwise provide input to the maintenance event indicator 740. In response to the received input, the maintenance event indicator 740 may be illuminated by the controller 700. The controller 700 may also cause the light electric vehicle 330 to send light electric vehicle information 345 to the maintenance system 325 of the light electric vehicle management system 305. In order to avoid accidental triggering of a maintenance event, in some examples, the provided input may be required to exceed a threshold amount of time (e.g., 5 seconds) before the maintenance event is reported to the maintenance system 325 and/or the maintenance event indicator 740 is illuminated.

Referring back to FIG. 3, the light electric vehicle management system 305 may also include a location detection system 315. The location detection system 315 may receive GPS data, GNSS data or other location information from the light electric vehicle 330, the controller and/or the computing device 340 of the individual. The location information may be received when an individual submits a request to use the light electric vehicle 330 and/or when the individual is riding the light electric vehicle 330 from an origin to a destination. For example, the location detection system may receive GPS or other location data from the light electric vehicle 330 in real-time or substantially real-time as the individual rides the light electric vehicle.

The location information may be used in a variety of ways. For example, if the location detection system 315 determines, based on the received location information, that the light electric vehicle 330 is currently located or stopped (e.g., over a threshold amount of time) in a no parking zone, the light electric vehicle management system 305 may send instructions 335 to the controller to illuminate a particular indicator (e.g., a no parking indicator) on the controller notifying the individual that the light electric vehicle 330 cannot be returned or parked at its current location. As such, if an individual attempts to end their reservation period in this zone, the controller may prohibit the individual from ending the reservation period until location information associated with the light electric vehicle indicates that the light electric vehicle has been moved out of the no parking zone.

Likewise, if the location detection system 315 determines that the light electric vehicle 330 is in a zone or area in which the speed limit of light electric vehicles 330 is limited or reduced (e.g., a pier or a boardwalk), the light electric vehicle management system 305 may send instructions 335 to the controller to illuminate a speed limit indicator on the controller and limit a top speed of the light electric vehicle. Once the location detection system 315 determines the light electric vehicle 330 has left these areas, the light electric vehicle management system 305 may send additional instructions 335 to the controller to turn off the illumination of these indicators and allow the light electric vehicle to increase its top speed.

The location information, alone or in combination with rider habit information (e.g., previous routes taken by an individual) may be used to determine whether one or more incentives are available to the individual riding the light electric vehicle 330. For example, current location information, along with previous routes or destinations of the individual, may be used to determine an anticipated destination of the individual and/or a route that the individual will take to reach the anticipated destination.

However, in some examples, the system 300 may determine that a light electric vehicle 300 should be taken to or parked at a particular location (e.g., a maintenance depot, a rechargeable battery kiosk, a particular area in which demand for light electric vehicles 330 is high, etc.). In such an event, the incentive system 320 may determine that the individual should be given an incentive for taking a particular action (e.g., parking the light electric vehicle at a particular location). In such examples, the light electric vehicle management system 305 may provide instructions 335 to the controller of the light electric vehicle to illuminate an incentive indicator. The light electric vehicle management system 305 may also provide information regarding the particular action and the associated incentive to the computing device 340 and/or a display of the controller.

For example and referring to FIG. 7, the controller 700 may include an incentive indicator 750 that can be illuminated to notify the individual that the individual may receive an incentive for taking a particular action. In some examples, the particular action may be communicated to the computing device (e.g., computing device 340 (FIG. 3)) associated with the individual and/or provided on a display of the controller 700. In other examples, the incentive indicator 750 may be illuminated only when the individual is requested to take a particular action (e.g., park the light electric vehicle at it determined current location).

As also shown in FIG. 7, the controller 700 may include a hold indicator 760. The hold indicator 760 may be used to change an operating state of the light electric vehicle by placing a temporary hold on the light electric vehicle during a reservation period. For example, if an individual riding the light electric vehicle from an origin to a destination stops at a particular location along the route, the individual may select or otherwise provide input to the hold indicator 760. Selection or actuation of the hold indicator 760 does not end the reservation period for the individual (e.g., the individual may still be charged for using the light electric vehicle during the hold period) but prevents other individuals from using that light electric vehicle. In some examples, selection of the hold mechanism automatically engages a locking mechanism of the light electric vehicle or allows the individual to manually lock the locking mechanism of the light electric vehicle.

When the hold indicator 760 is selected, the reserved visual indicator 730 may also be illuminated such as described above. In some examples, the hold indicator 760 is a selectable input mechanism such as a button, a switch, a capacitive and/or force sensor or other input mechanism that may be used to receive input from the individual. Like the maintenance event indicator 740, the controller 700 may not initiate a hold until the hold indicator 760 has received input over a threshold amount of time (e.g., 5 seconds).

The controller 700 may also include a power/sensor indicator 770. When selected, the power/sensor indicator 770 enables the individual to awaken the light electric vehicle from a sleep state, put the light electric vehicle into a sleep state and/or enable the individual to provide identification and verification information to the light electric vehicle via a sensor or communication channel. For example, if the individual wants to reserve the light electric vehicle, remove a hold on the light electric vehicle, unlock a locking mechanism of the light electric vehicle, unlock a rechargeable battery of the light electric vehicle or take other such actions, the individual my bring her computing device within a threshold distance of the power/sensor indicator 770. The computing device may then provide instructions to the controller 700 using the sensor and/or the communication channel.

The controller 700 may also include a rechargeable battery status indicator 780. The battery status indicator 780 may include a number of different lights or dots that may be illuminated based, at least in part, on an amount of charge remaining in a rechargeable battery of the light electric vehicle. For example, the fewer the number of dots that are illuminated, the less the remaining charge in the rechargeable battery. When all dots are illuminated, the rechargeable battery is fully charged. In some examples, the battery status indicator 780 may use a color-coded system to indicate a state of charge of the rechargeable battery.

The battery status indicator 780 may be illuminated along with the incentive indicator 750 to inform the individual that the individual may be given an incentive for initiating a rechargeable battery exchange (e.g., by exchanging the current rechargeable battery with a rechargeable battery in a battery kiosk). In other examples, the battery status indicator 780 may be illuminated along with the maintenance event indicator 740 to indicate that there is a detected problem with the rechargeable battery. Although specific examples are given, various combinations of indicators may be illuminated to convey various messages to the individual. In some examples, information regarding the illumination of the visual indicators may be provided by the controller 700 and/or the light electric vehicle management system 305 to the computing device of the individual and/or a display of the controller 700.

In addition to the various indicators of the controller 700 being illuminated, the light electric vehicle management system 305 may also provide one or more messages 360 to the computing device 340 of the individual and/or to the controller 700. The messages 360 may include video, text, sound and/or images that provide information related to the illumination of each visual indicator provided on the controller 700. For example, if the incentive indicator 750 is illuminated, the light electric vehicle management system 305 may provide an incentive message to the computing device 340 that outlines the actions the individual needs to perform in order to receive the offered incentive.

Although specific indicators are described, other indicators may be provided on the controller 700. For example, a selectable battery swap indicator may be provided on the controller 700. When the battery swap indicator is selected, the controller 700 may provide instructions to a battery holster (e.g., battery holster 140 (FIG. 1)) to release the rechargeable battery to enable the individual to initiate a rechargeable battery exchange. In another example, the battery swap indicator may be illuminated when the light electric vehicle is within a threshold distance of a rechargeable battery kiosk or when a charge level of the rechargeable battery is below a charge threshold.

In another example, the controller 700 may include a visual indicator that flashes or is otherwise illuminated to indicate that a theft event is occurring. For example, if the locking mechanism is engaged and the location information indicates that the light electric vehicle is moving, the light electric vehicle management system 305 may send instructions to the controller to illuminate the theft event indicator. Once activated, the theft event indicator may continue to be illuminated until a technician resets the indicator. In some examples, the controller 700 may prohibit a reservation of the light electric vehicle while the theft event indicator is illuminated.

The controller 700 may also include a selectable light indicator that turns one or more lights of the light electric vehicle on or off.

Figure 4:
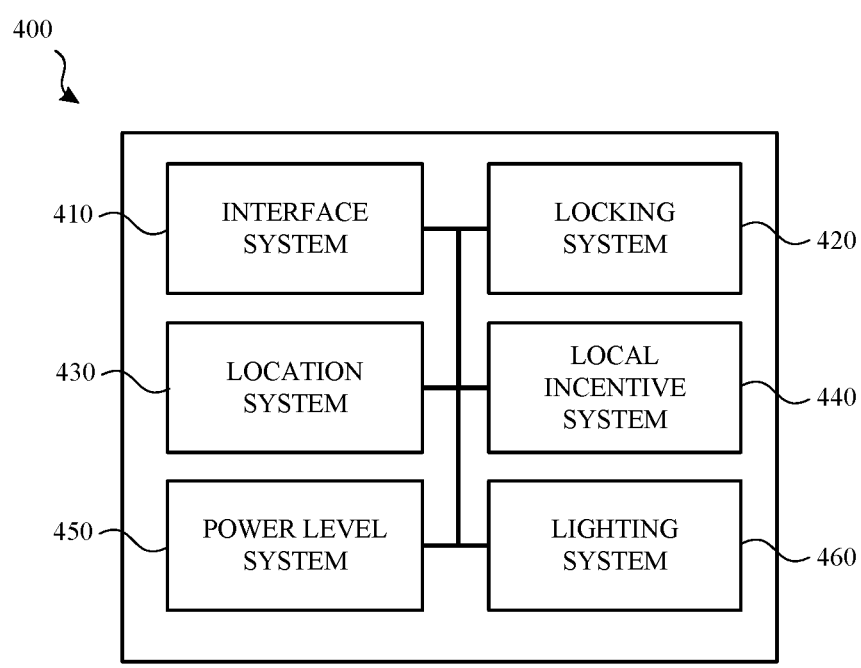
FIG. 4 is a block diagram illustrating various systems of a controller for a light electric vehicle according to an example.

FIG. 4 is a block diagram that illustrates various systems of an example controller 400 according to some examples. The systems of the controller 400 may be used by or otherwise integrated with the controller 700 shown and described with respect to FIG. 7. In addition to the various physical components shown and described with respect to FIG. 10 below, the controller 400 may include various specialized components and/or systems. These specialized components and/or systems may include an interface system 410, a locking system 420, a location system 430, an incentive system 440, a power level system 450 and a lighting system 460. Each of these systems may be subcomponents of a general software application and may be used for transferring data and controlling the various visual indicators described herein. Thus, the controller 400 may receive instructions from a light electric vehicle management system and illuminate one or more visual indicators based on those instructions or may be configured to illuminate one or more visual indicators based on information collected and/or received by the various systems shown in FIG. 4. Accordingly, the controller 400 may be a stand-alone system or may work in concert with the light electric vehicle management system.

In some examples, the interface system 410 may be used to illuminate the various indicators of the controller 400 and/or detect or otherwise receive input that is provided on the controller (e.g., selection of a button). The interface system 410 may include a display, one or more sensors to detect touch and/or force, an actuation mechanism, or other types of input and output devices.

The locking system 420 may control a locking mechanism associated with a light electric vehicle. In some examples, a lock in the locking mechanism may be an electro-mechanical lock with a steel U-bar or a flexible cable lock. Locking system 420 may detect whether the light electric vehicle is in a locked state or an unlocked state via wired or wireless communication with the locking mechanism attached to the light electric vehicle. An example locking mechanism is shown in FIGS. 9A-9C.

As indicated above, the interface system 410 may illuminate a locked indicator 710 and an unlocked indicator 720 (FIG. 7) based on the determined state of the locking mechanism. For example, when the locking mechanism is in a locked configuration, the locked indicator 710 can be illuminated. When the locking mechanism is in an unlocked state, the unlock indicator 720 can be illuminated.

In some examples, the controller 400 can detect the presence of an individual when the individual's computing device is within a detectable proximity of the controller 400. This may be accomplished using Bluetooth, BLE, NFC, or other communication protocol. The individual may also provide a barcode, token, passcode, fingerprint, or other identifying information to the controller 400 to initiate a reservation or use period. In some examples, the individual can provide verification information directly to the controller 400.

When the identity of the individual is verified, locking system 420 can unlock the locking mechanism by sending a signal to release a latch mechanism or other mechanism associated with the locking mechanism. When the individual has completed his or her session or wants to hold the light electric vehicle, the individual can manually lock the locking mechanism which sends a signal to the locking system 420 alerting the locking system 420 that the light electric vehicle is locked. Assuming that the light electric vehicle is not being held or is not otherwise reserved, once the locking mechanism has been locked, the light electric vehicle has a status of "available" such that another individual can reserve the light electric vehicle by providing credentials.

The locking system 420 may also include a "hold" mode. For example, an individual can place the light electric vehicle in the hold mode when the individual wants to lock the light electric vehicle with the intention of returning to the light electric vehicle within a period of time. When the light electric vehicle is placed in the hold mode, individuals other than the individual who placed the light electric vehicle in the hold mode cannot access the light electric vehicle. That is, even if another individual provides credentials to the controller 400, the locking mechanism will not unlock. To place the light electric vehicle in hold mode, the individual can select a hold request button on the controller such as the hold indicator 760 depicted on the example controller 700 shown and described with respect to FIG. 7.

As described above, the controller 700 may illuminate a reserved visual indicator 730 that indicates the light electric vehicle is unavailable because it is being held or reserved by another individual. In some examples, a display associated with the controller 400 and/or a computing device associated with the individual can display an amount of time remaining before the light electric vehicle is no longer in hold mode and is thus available for use by other individuals. Once the amount of time has expired, the controller 400 may automatically end a reservation period of the light electric vehicle thereby making the light electric vehicle available for another individual to reserve.

In some examples, an individual can reserve a light electric vehicle via an application executing on the computing device prior to being in a detectable range of the light electric vehicle. When the light electric vehicle has been placed in a "reserved" mode, the locking system 420 will not unlock the locking mechanism until an individual provides credentials matching those of the individual who reserved the light electric vehicle.

The location system 430 may include a GPS or GNSS module that can be used to monitor or otherwise detect the location of the light electric vehicle. The location of the light electric vehicle can be used for many purposes including tracking the location of the light electric vehicle, determining incentives, providing route information, and detecting other light electric vehicles that are nearby.

The local incentive system 440 may be used to determine incentives that may be offered to individuals based on various factors. These factors may include, but are not limited to GPS information collected by the location system 430, the location of other light electric vehicle in the fleet, known or determined light electric usage patterns of the individual, state of charge of a rechargeable battery of the light electric vehicle, and locations of charging stations/kiosks relative to the location of the light electric vehicle.

An incentive indicator (e.g., incentive indicator 750 (FIG. 7)) on the controller 400 can indicate a zone (e.g., bounded area) or a particular location (e.g., a charging station located at X and Y street) that the user can park the light electric vehicle to receive a financial incentive (e.g., a cheaper fare for the current session, a credit towards a next session). For example, the individual can receive a free ride or $1 off of the current session for parking (i.e., locking the light electric vehicle to a bike rack, light pole, street sign) anywhere in the zone. In another example, the user can receive $2 off of a next session for docking the light electric vehicle at a charging station anywhere in the zone. In a further example, the individual can receive $3 for docking the light electric vehicle at a charging station at a particular location.

The controller 400 and/or the individual's computing device can display the specific information such as the amount of the incentive and location. In some examples, the controller 400 can indicate only that there is an incentive to park the light electric vehicles in a specific zone indicated for example by color of the indicator. In some examples, the indicator simply indicates that the user can receive a financial incentive if the user parks the light electric vehicles in the current zone.

In some examples, the incentive indicator can be illuminated while the light electric vehicle is parked at a docking or charging station. Docking or charging stations can include incentive indicators. For example, when two or more light electric vehicles are docked at a docking or charging station, the incentive indicator can indicate the light electric vehicles that has the highest incentive to rent (i.e., the most discounted value). In some examples, additional or separate incentive indicators are located on the light electric vehicles apart from the interface of the controller 400. For example, a flashing tail light while the light electric vehicles is docked or parked outside of a docking station can indicate an incentive. In some examples, an incentive indicator can be included on a charging station.

Power level system 450 can monitor a state of charge of a rechargeable battery associated with the light electric vehicle. The rechargeable battery may also be used to provide power to the controller 400. The controller 400 can indicate a state of charge of the battery such as a battery status indicator 780 in the example controller 700 depicted in FIG. 7.

For example, the fewer the number of illuminated dots, the less the remaining charge in the rechargeable battery. When all dots are illuminated, the rechargeable battery may be fully charged. When no dots are illuminated, the rechargeable battery may have little to no remaining charge.

In some examples, the battery status indicator 780 uses a color-coded system to indicate a state of charge of the rechargeable battery.

In some examples, changes to the operation of the light electric vehicle can occur when the rechargeable battery is low. For example, the electric assist function can be curtailed completely or used only when the individual is going up a hill when the battery charge dips below a certain threshold. The individual can be notified of any operational changes via their computing device and/or by one or more visual indicators provided on the controller 400.

The lighting system 460 can control one or more lights on the light electric vehicle and/or on a docking station. For example, lighting system 460 can turn on and off certain lights based on a sensed amount of daylight, a time of day, a detected direction of a turn, a detected maintenance event, and/or a detected available incentive.

Figure 5A:
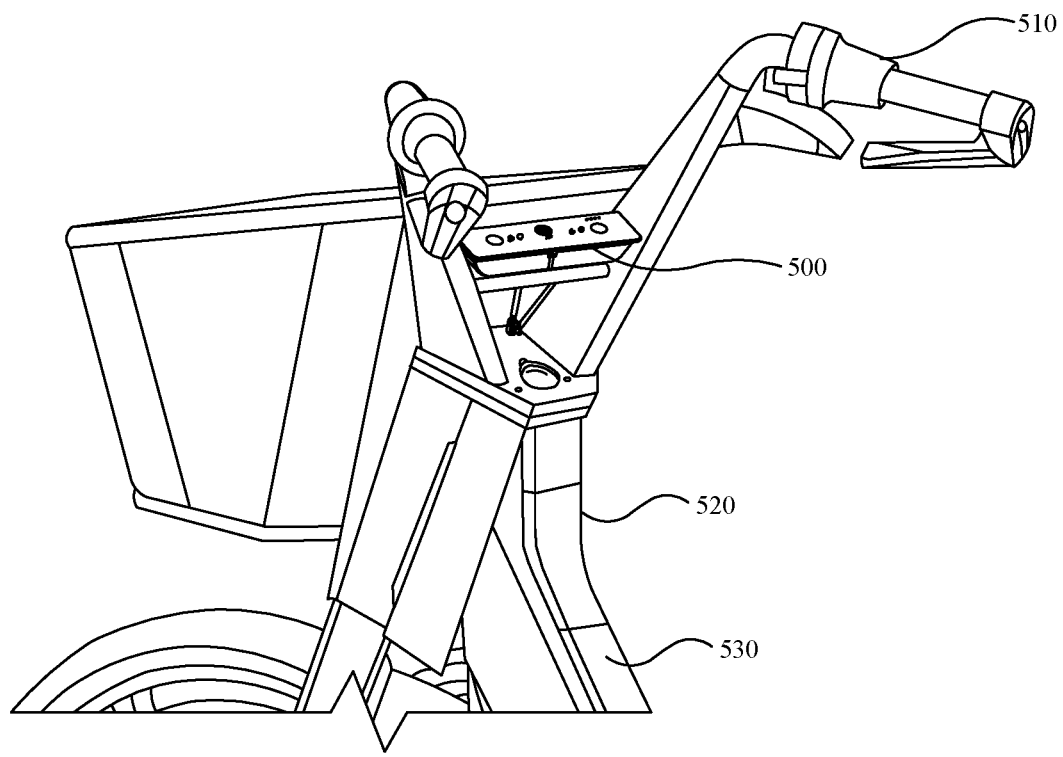
FIG. 5A is an isometric view of a controller for a light electric vehicle attached to handlebars of the light electric vehicle according to an example.

FIG. 5A illustrates an example controller 500 attached to the handlebars 510 of a light electric vehicle 520. As shown, the controller 500 may extend from one handlebar to the other, transverse to the longitudinal axis of the light electric vehicle 520. The controller 500 can be mounted above the connection of the handlebar 510 to the frame 530 of the light electric vehicle 520 for ease of accessibility for the individual.

Figure 5B:
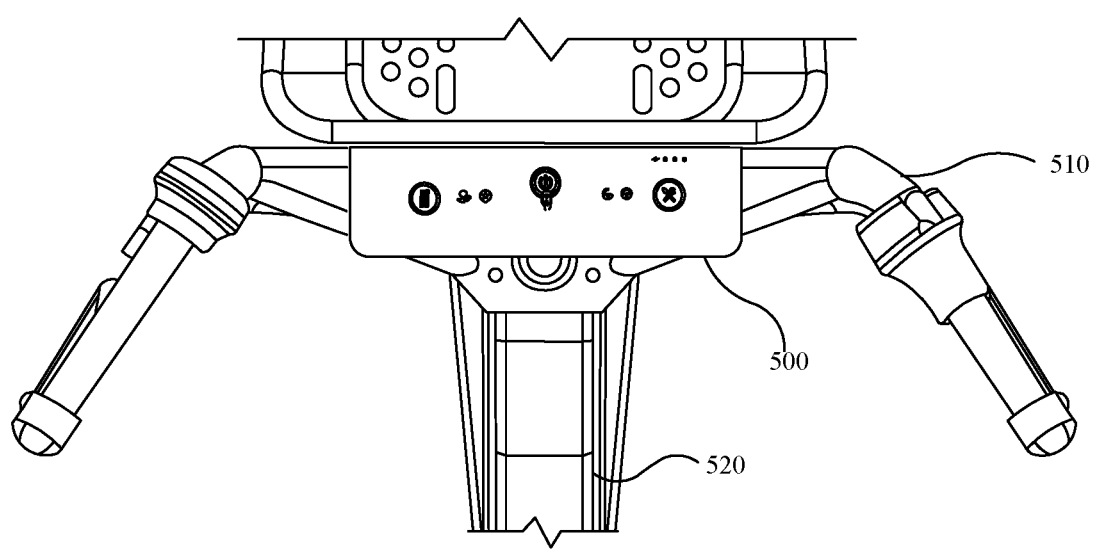
FIG. 5B is a top view of the controller of FIG. 5A according to an example.

FIG. 5B is a top view of the controller 500 attached to handlebars 510 of the light electric vehicle 520 according to an example.

Figure 6:
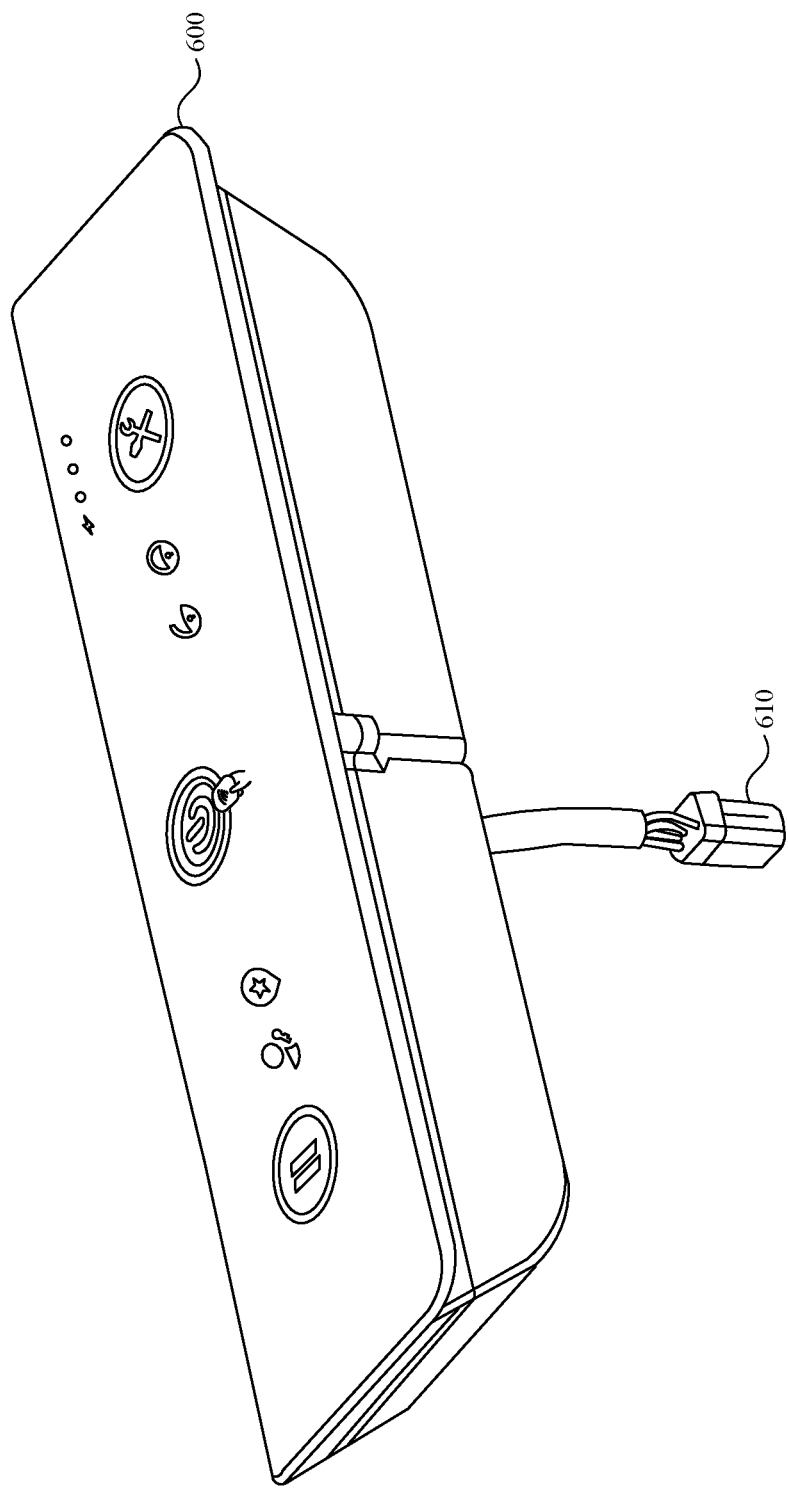
FIG. 6 is an isometric view of a controller for a light electric vehicle according to an example.

FIG. 6 is an isometric view of a controller 600 according to an example. The controller 600 can include wireless connections and/or wires 610 for wired connections to other components of the light electric vehicle.

Although the controller 700 shown in FIG. 7, was discussed above, a brief summary of the various visual indicators is provided below. In some examples, the controller 700 may include various interactive buttons and indicators. For example, the controller 700 can include a battery status indicator 780 to indicate a state of charge of the rechargeable battery of the light electric vehicle.

The controller 700 can include a status of the locking mechanism of the light electric vehicle: unlocked indicator 720 or locked indicator 710. The controller 700 can include an incentive indicator 750 to indicate that one or more incentives are available to the individual should the individual take one or more requested actions (e.g., parking the light electric vehicle at a certain location or within a certain area, performing a rechargeable battery exchange, moving a light electric vehicle from one location to another, etc.).

The controller 700 can include a hold indicator 760 to indicate that the light electric vehicle is currently being held or reserved by an individual and is not available to an individual other than the individual who held or reserved the light electric vehicle.

In addition to these indicators, the controller 700 can include several interactive buttons or other input devices. For example, the controller 700 can include a maintenance event indicator 740. The maintenance event indicator 740 may be both an indicator and a selectable button. When selected, the individual indicates that the light electric vehicle needs maintenance (e.g., hold the button to trigger a signal). In some examples, when the maintenance event indicator 740 has been selected, an operating state of the light electric vehicle may be altered. For example, the controller 700 may cause a reservation period of the light electric vehicle to end or prohibit the light electric vehicle from being reserved until the maintenance event has been addressed.

The controller 700 can send a maintenance event message to the light electric vehicle management system. The controller 700 can also include a hold indicator 760 that the individual can depress or otherwise provide input to indicate that the individual would like to continue the reservation session even though the individual is parking and engaging a locking mechanism of the light electric vehicle for a period of time. When this button is held, the individual can indicate, via a mobile application and/or using an interface provided on the controller, an amount of time the individual desires to hold the light electric vehicle.

Figure 8:
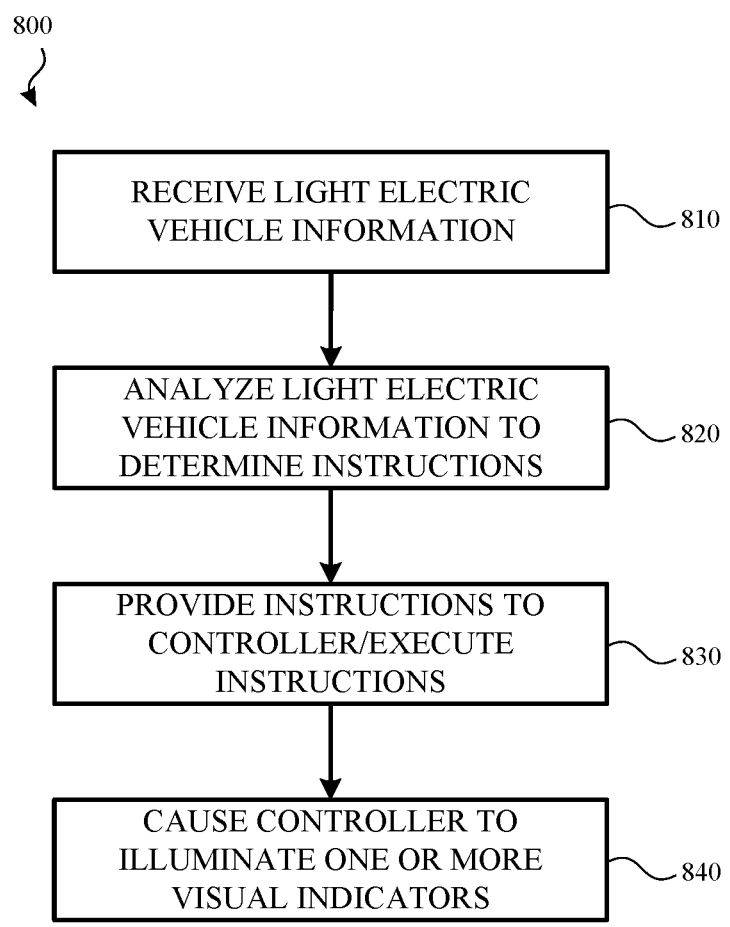
FIG. 8 illustrates a method for illuminating one or more visual indicators on a controller of a light electric vehicle according to an example.

FIG. 8 illustrates a method 800 for illuminating one or more visual indicators on a controller of a light electric vehicle according to an example. The method 800 may be performed in response to a processor of the controller receiving instructions from a light electric vehicle management system and/or in response to one or more instructions, inputs and/or information received in, on or by the controller.

Method 800 begins when light electric vehicle information is received (810). In some examples, the light electric vehicle information may be received by the controller, by the light electric vehicle management system or a combination thereof. The light electric vehicle information may include location information of the light electric vehicle, one or more operating parameters of the light electric vehicle, sensor information related to the light electric vehicle, incentive information associated with the light electric vehicle, etc.

The light electric vehicle information may also include information, data and/or input received by the controller associated with the light electric vehicle. For example, the light electric vehicle information may include information regarding whether an individual actuated a maintenance event indicator, a lighting system indicator, a power/sensor indicator, a lock/unlock indicator (e.g., to release a locking mechanism or rechargeable battery from a battery holster) or a hold indicator.

Once the light electric vehicle information is received, the light electric vehicle information may be analyzed to determine (820) one or more instructions that are to be provided to and/or executed by the controller. For example, if the received light electric vehicle information indicates that an incentive is available to the individual if the individual takes a particular action, an incentive system (e.g., incentive system 320 (FIG. 3) or local incentive system 440 (FIG. 4)) may use the information to determine the incentive, provide notice of the incentive to the controller or computing device of the individual, illuminate an incentive visual indicator and/or provide instructions for the particular action to a display of the controller and/or a computing device of the individual. In some examples, various systems may use the light electric vehicle information simultaneously or substantially simultaneously to determine one or more instructions that are to be sent to and/or executed by the controller.

Once the instructions are determined, the instructions are provided 830 to the controller (e.g., when the instructions are determined by the light electric vehicle management system) and/or are executed by the controller. When the instructions are executed, the controller illuminates (840) one or more visual indicators based on the instructions. For example, if the instructions relate to an incentive, execution of the instructions causes the incentive visual indicator to be illuminated.

FIGS. 9A-9C depict an example of a locking mechanism 900 that can be used to lock a light electric vehicle according to an example. More specifically, FIG. 9A illustrates an isometric view of the locking mechanism as viewed from the back side. The locking mechanism 900 can be mounted to a light electric vehicle using mounting hardware 910.

FIG. 9B illustrates an isometric view of the locking mechanism 900 as viewed from the front side according to an example. As shown, the locking mechanism 900 may include a cable 920 can be inserted into insertion point 930 to lock the locking mechanism 900. When the cable 920 is inserted into insertion point 930, the locking mechanism can send a message to the controller that the locking mechanism is locked. As a result, the controller may illuminate the locked indicator 710 (FIG. 7) such as previously described. When the locking mechanism 900 is unlocked (e.g., in response to an instruction received from the controller) the cable 920 may be removed from the insertion point 930 and the controller may illuminate the unlocked indicator 720 (FIG. 7).

FIG. 9C illustrates a light electric vehicle 940 locked to a bike rack 950 via the cable 920 according to an example. While FIG. 9C illustrates the light electric vehicle 940 being locked to a bike rack 950, the light electric vehicle 940 may be locked to a docking or charging station.

Those skilled in the art will appreciate that the components illustrated in figures described above, and in each of the flow diagrams discussed below, may be altered in a variety of ways. For example, the order of the logic may be rearranged, sub steps may be performed in parallel, illustrated logic may be omitted, other logic may be included, etc. In some implementations, one or more of the components described above can execute one or more of the processes described below.

Figure 10:
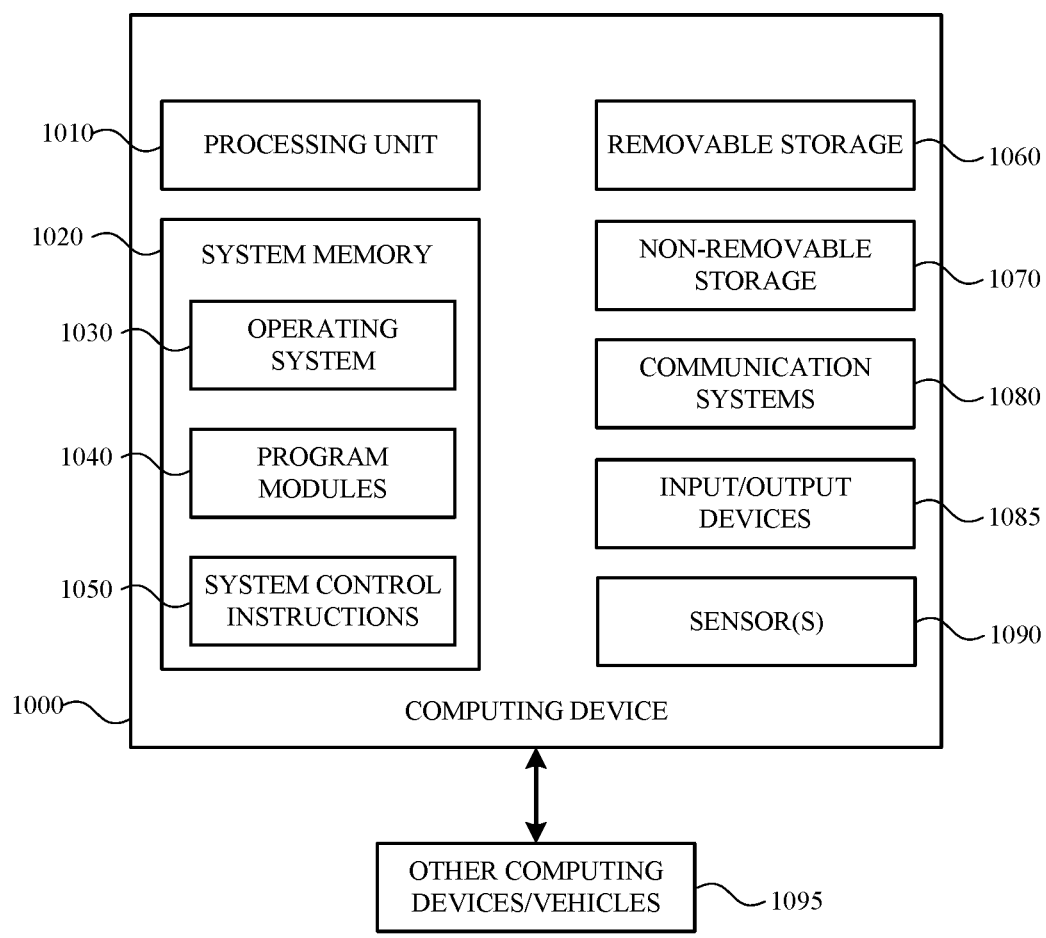
FIG. 10 illustrates various components of a computing device that may be included or otherwise associated with a controller and/or a light electric vehicle according to an example.

FIG. 10 is a system diagram of a computing device 1000 according to an example. The computing device 1000 may be integrated with or associated with a light electric vehicle, such as light electric vehicles 330 shown and described with respect to FIG. 3 and/or with a controller such as the controller 700 and controller 400 shown and described with respect to FIG. 7 and FIG. 4. The computing device 1000 may also be associated or otherwise integrated with the various systems shown and described with respect to FIG. 1 and FIG. 3. As shown in FIG. 10, the physical components (e.g., hardware) of the computing are illustrated and these physical components may be used to practice the various aspects of the present disclosure.

The computing device 1000 may include at least one processing unit 1010 and a system memory 1020. The system memory 1020 may include, but is not limited to, volatile storage (e.g., random access memory), non-volatile storage (e.g., read-only memory), flash memory, or any combination of such memories. The system memory 1020 may also include an operating system 1030 that controls the operation of the computing device 1000 and one or more program modules 1040. The program modules 1040 may be responsible for gathering or determining rider profile information, light electric vehicle information, including location information, riding habit information, and so on. The memory may also store and/or provide system control instructions 1050 that cause the controller to illuminate one or more visual indicators. A number of different program modules and data files may be stored in the system memory 1020. While executing on the processing unit 1010, the program modules 1040 may perform the various processes described above.

The computing device 1000 may also have additional features or functionality. For example, the computing device 1000 may include additional data storage devices (e.g., removable and/or non-removable storage devices) such as, for example, magnetic disks, optical disks, or tape. These additional storage devices are labeled as a removable storage 1060 and a non-removable storage 1070.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 10 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 1000 on the single integrated circuit (chip). The disclosure may also be practiced using other technologies capable of performing logical operations such as, for example, AND, OR, and NOT, including but not limited to mechanical, optical, fluidic, and quantum technologies. In addition, examples of the disclosure may be practiced using a computing device associated with or integrated with the electric vehicle and/or in any other circuits or systems.

The computing device 1000 may include one or more communication systems 1080 that enable the electric vehicle to communicate with rechargeable batteries, other computing devices 1095 (e.g., remote computing devices, controllers and/or light electric vehicles), a network service and the like. Examples of communication systems 1080 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 1000 may also have one or more input devices and/or one or more output devices shown as input/output devices 1085. These input/output devices 1085 may include a keyboard, a sound or voice input device, haptic devices, a touch, force and/or swipe input device, a display, speakers, etc. The aforementioned devices are examples and others may be used.

The computing device 1000 may also include one or more sensors 1090. The sensors may be used to detect or otherwise provide information about the operating condition of the computing device 1000. In other examples, the sensors 1090 may provide information about a light electric vehicle and/or the controller to which the computing device 1000 is associated. For example, the sensors 1090 may include a tire pressure sensor, a location sensor, an image sensor, a speed sensor, a tire alignment sensor, a rechargeable battery sensor and so on.

The term computer-readable media as used herein may include computer storage media. Computer storage media may include volatile and nonvolatile, removable and non-removable media implemented in any method or technology for storage of information, such as computer readable instructions, data structures, or program modules.

The system memory 1020, the removable storage 1060, and the non-removable storage 1070 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Several implementations of the disclosed technology are described above in reference to the figures. The computing devices on which the described technology may be implemented can include one or more central processing units, memory, input devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

What is claimed is:

1. A controller for a light electric vehicle, comprising:
   a set of visual indicators, each visual indicator of the set of visual indicators being selectively illuminated based, at least in part, on detected information associated with the light electric vehicle; and
   at least one selection mechanism that, when selected, provides information about the light electric vehicle to a light electric vehicle management system or alters an operating state of the light electric vehicle,
   wherein the at least one selection mechanism includes an unlock button that unlocks a rechargeable battery from a battery holster of the light electric vehicle.

2. The controller of claim 1, wherein the set of visual indicators includes one or more of a locked visual indicator, an unlocked visual indicator, a rechargeable battery status indicator, an incentive indicator or a maintenance event indicator.

3. The controller of claim 1, wherein the at least one selection mechanism includes a hold button and the hold button suspends a reservation period of the light electric vehicle.

4. A method, comprising
   receiving light electric vehicle information;
   analyzing the light electric vehicle information to determine one or more instructions for a controller associated with the light electric vehicle, the controller comprising one or more visual indicators; and
   sending the instructions to the controller to cause the controller to illuminate at least one of the one or more visual indicators,
   altering an operating state of the light electric vehicle based, at least in part, on the light electric vehicle information with at least one selection mechanism on the controller,
   wherein the at least one selection mechanism provides information about the light electric vehicle to a light electric vehicle management system,
   wherein the at least one selection mechanism includes an unlock button, wherein the unlock button unlocks a rechargeable battery from a battery holster of the light electric vehicle.

5. The method of claim 4, further comprising receiving operating status information of the light electric vehicle from the controller.

6. The method of claim 4, further comprising sending one or more messages to a computing device associated with the individual, the one or more messages including information corresponding to the illuminated at least one of the one or more visual indicators.

7. The method of claim 4, further comprising sending one or more messages to a display device associated with the controller, the one or more messages including information corresponding to the illuminated at least one of the one or more visual indicators.

8. The method of claim 4, further comprising sending instructions to the controller to cause the controller to turn off the illumination of the illuminated at least one of the one or more visual indicators.

9. A system, comprising
   at least one processor; and
   a memory coupled to the at least one processor and storing instructions that, when executed by the at least one processor, perform operations, comprising:
   receiving light electric vehicle information;
   analyzing the light electric vehicle information to determine one or more instructions for a controller associated with the light electric vehicle, the controller comprising one or more visual indicators; and
   sending the instructions to the controller to cause the controller to illuminate at least one of the one or more visual indicators,
   wherein the controller comprises one or more selectable buttons including an unlock button that unlocks a rechargeable battery from a battery holster of the light electric vehicle.

10. The system of claim 9, further comprising instructions for receiving operating status information of the light electric vehicle from the controller.

11. The system of claim 9, further comprising instructions for sending one or more messages to a computing device associated with the individual, the one or more messages including information corresponding to the illuminated at least one of the one or more visual indicators.

12. The system of claim 9, further comprising instructions for sending one or more messages to a display device associated with the controller, the one or more messages including information corresponding to the illuminated at least one of the one or more visual indicators.

13. The system of claim 9, further comprising instructions for altering an operating state of the light electric vehicle based, at least in part, on the light electric vehicle information.

14. The system of claim 9, further comprising instructions for sending instructions to the controller to cause the controller to turn off the illumination of the illuminated at least one of the one or more visual indicators.

15. The system of claim 9, wherein the one or more selectable buttons includes a hold button and the hold button suspends a reservation period of the light electric vehicle.

16. The method of claim 4, wherein the at least one selection mechanism includes a hold button and the hold button suspends a reservation period of the light electric vehicle.

* * * * *